United States Patent [19]

Dale et al.

[11] Patent Number: 5,490,092

[45] Date of Patent: Feb. 6, 1996

[54] VEHICLE RIDE HEIGHT MEASUREMENT APPARATUS AND METHOD

[75] Inventors: James L. Dale; Raymond Titsworth, both of Conway, Ark.

[73] Assignee: FMC Corporation, Chicago, Ill.

[21] Appl. No.: 114,258

[22] Filed: Aug. 30, 1993

[51] Int. Cl.[6] .......................... G01B 21/04; G01C 15/12
[52] U.S. Cl. .................... 364/562; 364/560; 33/1 CC; 33/284; 33/608; 33/759
[58] Field of Search ............................ 364/560, 561, 364/562; 33/761, 762, 763, 600, 608, 1 CC, 282, 283, 281, 284, 701, 755, 759, 760; 356/1, 3, 138, 383

[56] References Cited

U.S. PATENT DOCUMENTS

| | | | |
|---|---|---|---|
| 3,633,010 | 1/1972 | Svetlichny | 356/4 X |
| 4,266,790 | 12/1981 | Uemura et al. | 280/6.1 |
| 4,483,546 | 11/1984 | Brearley | 280/6 R |
| 4,700,972 | 10/1987 | Young | 280/707 |
| 4,779,212 | 10/1988 | Levy | 364/562 |
| 4,822,063 | 4/1989 | Yopp et al. | 280/840 |
| 4,838,563 | 6/1989 | Konishi et al. | 280/840 |
| 4,918,821 | 4/1990 | Bjork | 33/203.18 |
| 4,977,524 | 12/1990 | Strege et al. | 364/562 |
| 5,029,397 | 7/1991 | Palombi | 33/288 |
| 5,039,217 | 8/1991 | Maekawa et al. | 356/1 |

*Primary Examiner*—Emanuel T. Voeltz
*Assistant Examiner*—M. Kemper
*Attorney, Agent, or Firm*—Henry C. Query, Jr.

[57] ABSTRACT

An apparatus and method for determining the vertical distance between a point on a vehicle and a reference line comprises a linear measuring device, a fixture to aid in the taking of linear measurements of the point along two oblique angles, and a computer for calculating the vertical distance from these two measurements.

15 Claims, 3 Drawing Sheets

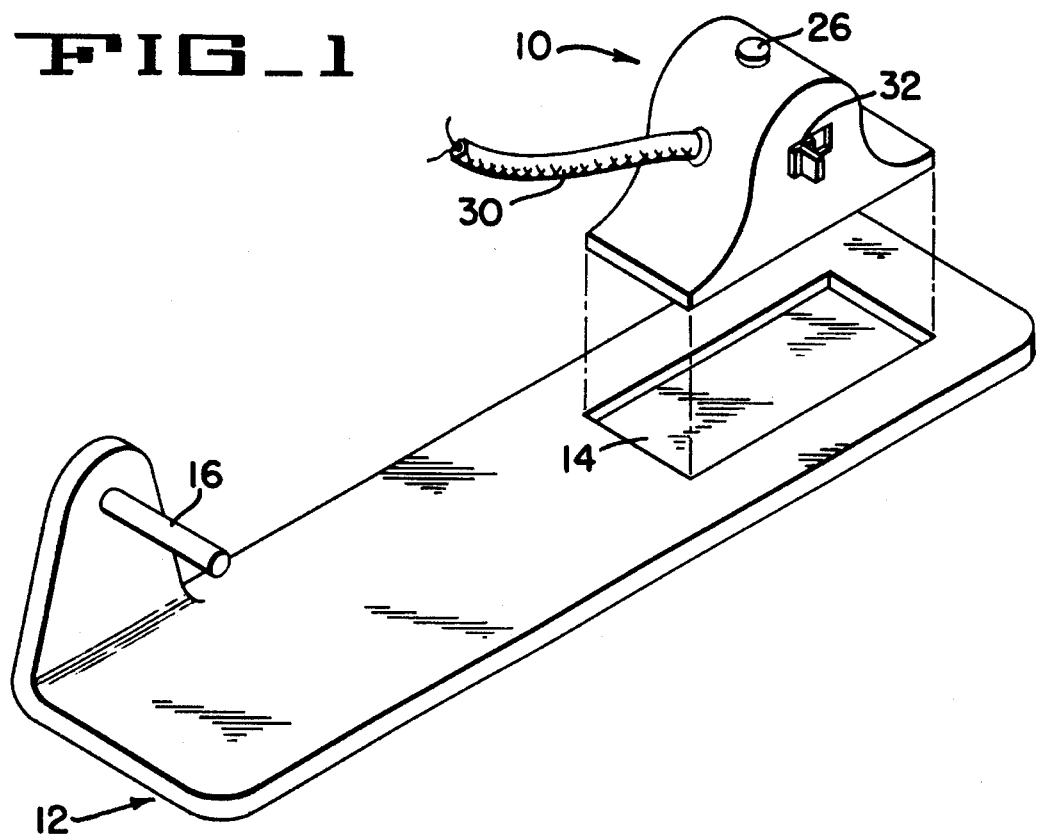
FIG_1
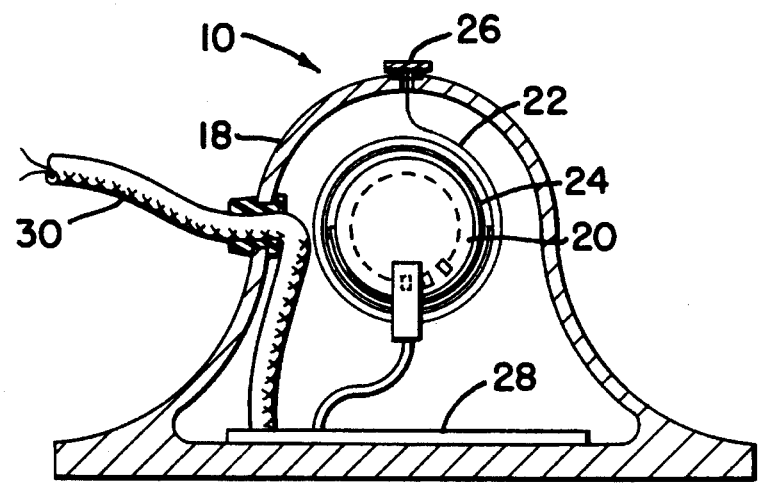
FIG_2

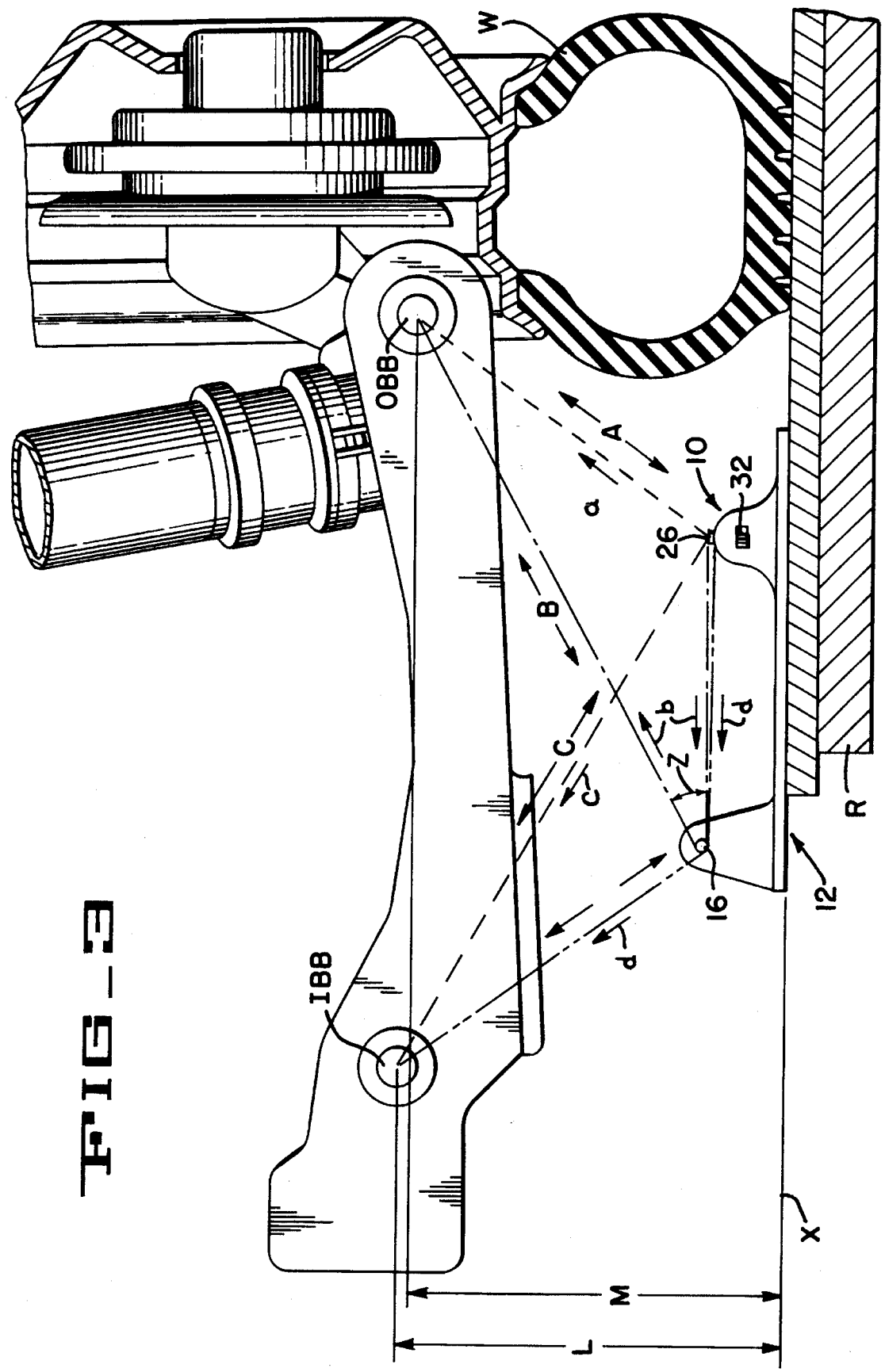

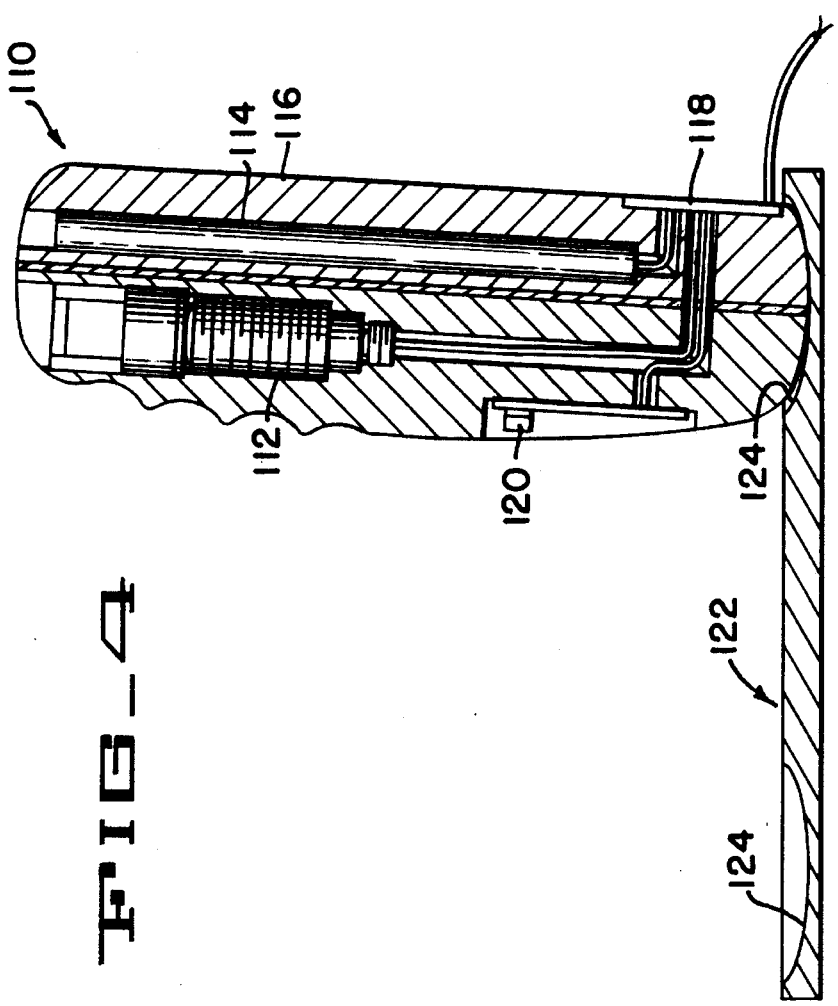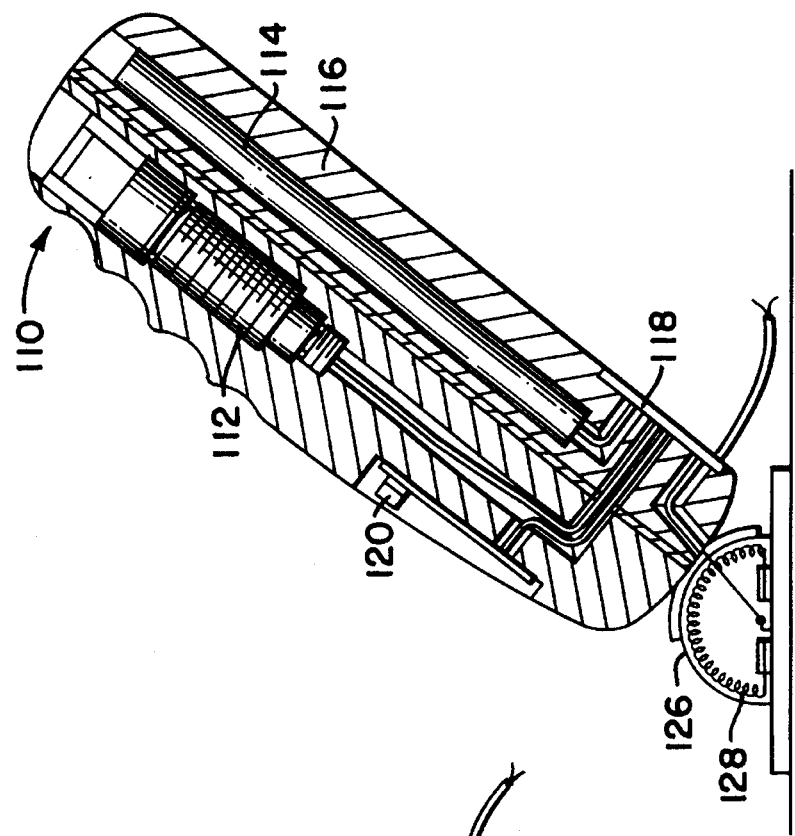

VEHICLE RIDE HEIGHT MEASUREMENT APPARATUS AND METHOD

BACKGROUND OF THE INVENTION

1. Field of the Invention

The present invention relates to an apparatus and method for measuring the ride height of a vehicle. More particularly, the invention relates to an apparatus and method for taking indirect measurements of vehicle body elevation relative to the suspension system.

2. Description of Related Art

The ride height of a vehicle is generally considered to be the elevation of the vehicle body with respect to the vehicle suspension system. Vehicle wheel alignment is closely related to ride height in that, over time, changes in the suspension system due to worn or damaged springs, shocks, ball joints or the like can affect wheel alignment. Since manufacturers' specifications for wheel alignment factors such as camber and toe are typically provided with respect to a new suspension system, it is important that changes in the suspension system be accounted for before performing a wheel alignment. These changes can be measured by comparing the values for the ride height of a new vehicle, which are typically provided by the manufacturer, with the actual measured values for ride height.

In the prior art, ride height is measured by determining the vertical distances between points on the vehicle and the ground, e.g., between the rocker panel and the ground, and/or between two points on the suspension system, e.g., between the rear inner bushing bolt and the rear outer bushing bolt. These distances are typically measured by a service technician using a tape measure. However, certain devices and methods have been developed to make these measurements easier. For example, U.S. Pat. No. 4,977,524 to Strege et al. discloses an apparatus for visually displaying representations of the appropriate measuring points for a specific vehicle and an electronic measuring gauge for automatically transmitting the values measured by the technician at these points to a system computer. The main drawback with many prior art devices, however, is that the vertical measurements must be taken directly, but the configuration of the suspension system often interferes with such direct vertical measurements. As a result, the service technician often approximates the measurements and this can lead to inaccurate ride height determinations.

SUMMARY OF THE INVENTION

It is therefore an object of the present invention to provide an apparatus and method for taking ride height measurements that does not require direct vertical measurements.

According to the present invention, this and other objects and advantages are achieved by providing a ride height measurement method that relies on triangulation to determine direct vertical distances from indirect, or non-vertical, measurements. The apparatus of the present invention accordingly comprises a triangulation fixture and an electronic measuring device that may include a string or cable connected to a rotary encoder and associated circuitry for generating signals representative of linear distances. The triangulation fixture is used for aiding in the taking of the indirect measurements and preferably includes a seat for the electronic measuring device and a pintle spaced horizontally a known distance from the seat. The fixture, including the measuring device, is placed below the vehicle on a level with the bottom of the wheels. The string is first extended at an oblique angle to a point to be measured, whereupon the linear distance from the measuring device is recorded in a system computer contained in, e.g., the console of a wheel alignment machine. The string is then extended around the pintle and at another oblique angle to the same point, and this linear distance is once again recorded in the computer. Using rules of trigonometry, the computer is able to calculate the vertical distance between the point and the bottom of the wheels using these two values and the known distance between the seat and the pintle.

In another embodiment of the invention, the electronic measuring device comprises a non-contact ranging device and means for illuminating the point to be measured, such as a laser pointer. In this embodiment, a triangulation fixture is also provided to aid in the taking of indirect measurements from which the direct vertical distances can be computed. The triangulation fixture includes two seats which are spaced horizontally apart a known distance. In this embodiment, the triangulation fixture, including the measuring device, is placed below the vehicle on a level with the bottom of the wheels. The measuring device is then aimed at an oblique angle toward the point to be measured, which is illuminated by the laser pointer, and activated to measure the linear distance to that point. This value is transmitted to the computer and the step is repeated with the measuring device in the second seat. Using rules of trigonometry, the computer is able to calculate the vertical distance between the point and the ground using these two values and the known distance between the two seats.

In yet another embodiment of the invention, the electronic measuring device of the previous embodiment is connected to a holder which comprises means for measuring the angle between the measuring device and the horizontal. In this embodiment, the holder is placed on a level with the bottom of the wheels, the measuring device is aimed at an oblique angle toward the point to be measured, the laser pointer is activated to illuminate the point and thereby ensure that the measuring device is aimed correctly, and the ranging device and angle measuring means are activated to measure the linear distance to the point and the angle between the measuring device and horizontal. These values are then transmitted to the computer, which can calculate the vertical distance using rules of trigonometry.

The apparatus and methods briefly described above therefore provide for quick and simple measurements of the ride height of a vehicle. In addition, since direct vertical measurements need not be taken, the configuration of the suspension system will not interfere with the measurements.

These and other objects and advantages of the present invention will be made apparent from the following detailed description, with reference to the accompanying drawings.

BRIEF DESCRIPTION OF THE DRAWINGS

FIG. 1 is a perspective view of the electronic measuring device and triangulation fixture of the present invention;

FIG. 2 is a cross-sectional view of the electronic measuring device depicted in FIG. 1;

FIG. 3 is a representation of a portion of the suspension system of a vehicle and the operation of the invention to determine the vertical distance between two points on the suspension system;

FIG. 4 is a side cross-sectional view of the electronic measuring device and triangulation fixture according to a second embodiment of the present invention; and FIG. 5 is a side cross-sectional view of the electronic measuring device of yet another embodiment of the present invention.

DETAILED DESCRIPTION OF THE PREFERRED EMBODIMENTS

Referring to FIG. 1, the apparatus of the present invention comprises an electronic measuring device 10 and an associated triangulation fixture 12, which includes a seat 14 for measuring device 10 and a pintle 16 spaced horizontally a known distance from seat 14. The diameter of pintle 16 is selected to be as small as possible, e.g., one-eighth inch, so as not to affect the measurements, which will be described later, to any significant degree. Otherwise, a correction factor for the diameter of pintle 16 is necessary.

Referring to FIG. 2, electronic measuring device 10 comprises a housing 18 and a rotary encoder 20, such as a conventional optical rotary encoder or any other similar means capable of generating signals representative of discrete distances. A string or flexible cable 22 is wound around and connected at one end to a reel 24, which is rotationally mounted within housing 18 and connected to encoder 20. The other end of string 22 extends through an opening in housing 18 and is connected to a lug 26. A coil spring (not shown) is connected between reel 24 and housing 18 to provide a tensioning force tending to keep string 22 wound around reel 24. Encoder 20 is electrically connected to a circuit 28, which operates in a known manner to count the pulses generated by encoder 20 and produce a signal representative of linear distance. A power and data transmission cable 30 connects circuit 28 with a computer housed within the console of, e.g., a vehicle wheel aligner (not shown). Of course, circuit 28 may be eliminated and the signals generated by encoder 20 transmitted directly by cable 30 to the computer, if so desired. The zero position of electronic measuring device 10 is established with lug 26 against housing 18, as shown in FIG. 2.

FIG. 3 depicts a portion of a typical suspension system and the method by which the apparatus of the present invention can be used to determine the vertical distance between two points on the suspension system. The vertical distance L–M is a common ride height measurement value. L is the vertical distance from reference line X to the centerline of the rear inner bushing bolt IBB and M is the vertical distance from reference line X to the centerline of the rear outer bushing bolt OBB. As is apparent from FIG. 3, the distance L–M cannot be measured directly. In addition, the wheel of the vehicle interferes with a direct vertical measurement of M. Furthermore, the vertical distance L is difficult to measure directly if point IBB is above an open workspace in the lift or rack.

Triangulation fixture 12 overcomes these problems by allowing for the taking of indirect measurements from which the direct vertical distances can be computed. According to the method of the present invention, triangulation fixture 12, including electronic measuring device 10, is placed on a level even with the bottom of wheel W, i.e., either on the ground or, as depicted in FIG. 3, the track of a vehicle lift or rack R. Triangulation fixture 12 is oriented with its longitudinal axis generally in the vertical plane which passes through the two points to be measured. (If only one of the points needs to be measured, triangulation fixture 12 is oriented with its longitudinal axis in alignment with the point to be measured.) Assuming point OBB is to be measured first, the operator extends lug 26 to point OBB, as indicated by arrow "a" in FIG. 3. The linear distance A, which is determined by encoder 20, is then transmitted to and stored in the computer. Next, the operator extends lug 26 around pintle 16 to the same point OBB, as indicated by arrows "b". The linear distance B between pintle 16 and point OBB is then computed by the computer by subtracting the known distance between linear measuring device 10 and pintle 16 from the linear distance to point OBB around pintle 16, which is the distance determined by encoder 20. With the sides of the obtuse triangle defined by triangulation fixture 12 and distances A and B thus determined, the obtuse triangle can be solved for its angles. With this information, the right triangle having a hypotenuse formed by one side of the obtuse triangle can be solved to determine the vertical distance between point OBB and the top of linear measuring device 10. The vertical distance L is determined in a similar manner by measuring the linear distance C to point IBB and determining the linear distance D from pintle 16 to point IBB. The vertical distance between points OBB and IBB, i.e., the desired ride height measurement, is then computed from the values for L and M.

Since electronic measuring device 10 can also be used for making direct vertical measurements, a switch 32 (FIGS. 1 and 3) is provided to signal the computer when either a single direct vertical measurement or two indirect measurements will be taken. When switch 32 is set for taking two indirect measurements, the computer will recognize the first value received from encoder 20 as the distance from electronic measuring device 10 directly to the point to be measured and the second value received as the distance from electronic measuring device 10 around pintle 16 to the point to be measured.

In a variation on this embodiment, Circuit 28 of electronic measuring device 10 could include suitable computing circuit means, such as a microprocessor, to perform all the computations required to determine vertical distances to points on the suspension system or vehicle body from the indirect distances measured by encoder 20. The computing circuit could also be programmed to take the difference between two consecutively determined vertical distances in order to determine a desired ride height measurement value between, e.g., two points on the suspension system. These values could then either be displayed to the service technician on a display device incorporated into electronic measuring device 10 or transmitted to the console to be displayed on the vehicle wheel aligner. Furthermore, the electronic measuring device 10 of this embodiment could be battery powered, thus requiring no power connection to the vehicle wheel aligner.

In another variation of this embodiment, triangulation fixture 12 could simply comprise two seats 14 spaced a part a known horizontal distance. According to this variation, electronic measuring device 10 is placed in one of the seats 14 and a first measurement is taken of the linear distance to a point on the vehicle, and then electronic measuring device 10 is placed in the other seat 14 and a second measurement is taken of the linear distance to the point. In the manner described above, the computer can then calculate the vertical distance to the point from these two measurements, the known distance between the seats 14 and the known height of electronic measuring device 10. While it is apparent that there are many possible variations for the structure of triangulation fixture 12, the present invention is intended to cover all means by which measurements of the linear distance to a point on the vehicle can be made along two distinct oblique angles.

In another embodiment of the invention, depicted in FIG. 4, an electronic measuring device 110 comprises a non-contact distance ranging device 112, such as the DMS-1000-30MM Transducer available from Ultrasonic Arrays Inc. This specific ranging device has an operating range of 0.2 to 24 inches. Measuring device 110 preferably also includes means for illuminating the point to be measured, such as a laser pointer 114. Ranging device 112 and pointer 114 are mounted within a housing 116 with their operative ends near the top of housing 116. Ranging device 112 and pointer 114 are electrically connected to a circuit 118, which in turn is connected to a computer in the console of, e.g., a vehicle wheel aligner (not shown). A switch 120 connected to circuit 118 controls the operation of ranging device 112 and pointer 114. Switch 120 preferably comprises a first setting for activating pointer 114 and a second setting for operating ranging device 112 while pointer 114 remains activated. Switch 120 also preferably includes a setting to signal the computer when either a single direct vertical measurement or two indirect measurements will be taken.

The triangulation fixture of this embodiment of the invention, generally 122, comprises two seats 124 spaced apart a known horizontal distance.

In the method of the present invention employing measuring device 110, triangulation fixture 122 is placed on a level even with the bottom of the wheels of the vehicle with its longitudinal axis aligned with the point to be measured. Measuring device 110 is placed in one of seats 124 and directed toward the point on the vehicle body or suspension system desired to be measured. Pointer 114 is then activated to illuminate the point and thereby assure that measuring device 110 is aimed correctly. Ranging device 112 is then activated and a first value for the distance to that point is transmitted to the computer. Measuring device 110 is then placed in the second seat 124 and pointer 114 is again activated to illuminate the same point, whereupon ranging device 112 is activated and a second value for the distance to that point is transmitted to the computer. In a manner similar to that described in the first embodiment, the computer calculates the vertical distance to the point from these two values, the known height of measuring device 110 and the known distance between seats 124. Thus, the ride height measurements can be taken without directly contacting the points to be measured.

Circuit 118 of measuring device 110 could comprise suitable computing means, such as a microprocessor, for performing all of the computations required to determine the vertical distances between points on the vehicle. In addition, measuring device 110 could comprise a display means, such as an LED, to display the results directly to the service technician taking the measurements. Furthermore, measuring device 110 could be battery powered, thus requiring no power connection to the vehicle wheel aligner.

In yet another embodiment of the present invention, depicted in FIG. 5, measuring device 110 is connected to a holder 126 that comprises a means 128 for measuring the angle between measuring device 110 and the horizontal. Angle measuring means 128 could include, e.g., a rotary encoder or a potentiometer, which is shown in FIG. 5. Angle measuring means 128 is electrically connected to circuit 118, which preferably comprises means for converting the signals generated by angle measuring means 128 into representations of angular measurement. Housing 116 is connected to holder 126 is such a way that angle measuring means 128 will measure the angle between the longitudinal axis of measuring device 110 lying approximately equally between ranging device 112 and pointer 114 and the horizontal. In this embodiment, actuation of switch 120 to activate ranging device 112 will also activate angle measuring means 128.

In the method of the invention employing the apparatus of this embodiment, holder 126 is placed on a level even with the wheels of the vehicle, measuring device 110 is tilted toward the point to be measured, pointer 114 is activated to illuminate the point to be measured to ensure that measuring device 110 is aimed correctly, and ranging device 112 and angle measuring means 128 are activated to measure the distance to the point and the angle of measuring device 110 to horizontal, respectively. Using trigonometric formulas, the computer can then calculate the vertical distance between the bottom of the wheels and the point being measured from these two values and the known distance between the top of ranging device 112 and the bottom of holder 126. Thus, ride height measurements can be taken quickly and easily without having to align measuring device 110 vertically with the point to be measured and without requiring direct contact between the measuring device and the point to be measured.

In a variation of this embodiment, a contact ranging device, such as the linear measuring device described previously, is combined with an angle measuring means. In this variation, the determination of the vertical distance between a point on a vehicle and a reference level involves aligning the linear measuring device with the point and extending the lug of the linear measuring device to the point. The angle and distance to the point are then used to determine the vertical distance between the reference level and the point, as described above.

The apparatus described with respect to the above embodiments can also be used to determine the horizontal distance between two points on a vehicle, the angular orientation of a vehicle member with respect to a horizontal reference plane, such as the ground or the vehicle lift, and the relationship between multiple vehicle members. It should be apparent from the above description that, using rules of trigonometry, the horizontal distance between the measuring device and a point on the vehicle can be easily determined from the measurements taken with the measuring device. For example, referring to FIG. 3, the horizontal distance between the top of linear measuring device 10 and point OBB can be determined once the distances A and B are measured and the computer solves for the angle z. In a similar manner, the horizontal distance between linear measuring device 10 and point IBB can be determined. The two horizontal distances thus determined can be used to determine the relative horizontal distance between the two points. In addition, the horizontal distances can be used together with the vertical distances, determined as described above, to determine the length and angular orientation of the member extending between the two points. By positioning the measuring device on a horizontal reference plane, such as the vehicle lift, and aligning it in the vertical plane containing the member, the vertical and horizontal distances determined for the endpoints of the vehicle member provide coordinates for the endpoints in the vertical plane. The length and angular orientation of the member in the vertical plane can be computed from the coordinates. This information can be compared with information determined for similar members on the vehicle, e.g. the steering linkages, or with manufacturers' specifications to determine if the vehicle is in need of repair.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. A device for determining the vertical distance between a point on a vehicle and a reference line which comprises:

means for measuring the linear distance to the point;

means for guiding the operation of the measuring means to obtain measurements of the linear distance to the point along at least two distinct oblique angles; and means for automatically computing the vertical distance between the point and the reference line from the at least two measurements made by the measuring means.

2. The device of claim 1, wherein the means for guiding comprises a seat for the measuring means and a pintle spaced a known horizontal distance from the seat.

3. The device of claim 1, wherein the means for guiding comprises two seats for the measuring means spaced apart a known horizontal distance.

4. The device of claim 1, wherein the measuring means comprises a rotary encoder and means for converting pulses generated by the rotary encoder into representations of distance.

5. The device of claim 1, wherein the measuring means comprises a non-contact ranging device.

6. The device of claim 5, wherein the measuring means further comprises means for illuminating the point on the vehicle to be measured.

7. The device of claim 6, wherein the means for illuminating comprises a laser pointer.

8. A device for determining the vertical distance between a point on a vehicle and a reference line which comprises:

means for measuring the linear distance to the point;

means for measuring the angle between the linear measuring means and the reference line; and means for automatically computing the vertical distance between the point on the vehicle and the reference line from the linear and angular measurements 9. The device of claim 8, wherein the linear measuring means comprises a non-contact ranging device.

10. The device of claim 9, wherein the linear measuring means further comprises means for illuminating the point on the vehicle to be measured.

11. The device of claim 10, wherein the illuminating means comprises a laser pointer.

12. The device of claim 8, wherein the angle measuring means comprises a potentiometer.

13. The device of claim 8, wherein the angle measuring means comprises an encoder.

14. The device of claim 8, wherein the linear measuring means comprises a contact ranging device.

15. A method of determining the condition of a vehicle from the angular orientations of first and second vehicle members with respect to a horizontal reference plane which comprises the steps of:

positioning a measuring device in a vertical plane containing the first vehicle member;

measuring the vertical and horizontal distances from the measuring device to each of a first point on the first vehicle member and a second point on the first vehicle member;

calculating the angular orientation of the first vehicle member in the vertical plane from the vertical and horizontal distances measured for each point;

positioning the measuring device in a vertical plane containing a second vehicle member;

measuring the vertical and horizontal distances from the measuring device to each of a first point on the second vehicle member and a second point on the second vehicle member;

calculating the angular orientation of the second vehicle member in the vertical plane from the vertical and horizontal distances measured for each point;

comparing the angular orientation of the first vehicle member with the angular orientation of the second vehicle member; and determining from the comparison whether the vehicle is in need of repair.

* * * * *